US009114491B2

(12) United States Patent
Kakiuchi et al.

(10) Patent No.: US 9,114,491 B2
(45) Date of Patent: Aug. 25, 2015

(54) DRIVING SOURCE SUPPLY SYSTEM OF POWER TOOL AND ATTACHMENT DEVICE

(75) Inventors: Yasuhiro Kakiuchi, Anjo (JP); Hajime Takeuchi, Anjo (JP); Yoshitaka Machida, Anjo (JP)

(73) Assignee: MAKITA CORPORATION, Anjo-Shi (JP)

( * ) Notice: Subject to any disclaimer, the term of this patent is extended or adjusted under 35 U.S.C. 154(b) by 524 days.

(21) Appl. No.: 13/574,928

(22) PCT Filed: Feb. 10, 2011

(86) PCT No.: PCT/JP2011/052823
§ 371 (c)(1),
(2), (4) Date: Jul. 24, 2012

(87) PCT Pub. No.: WO2011/114818
PCT Pub. Date: Sep. 22, 2011

(65) Prior Publication Data
US 2012/0298391 A1 Nov. 29, 2012

(30) Foreign Application Priority Data

Mar. 16, 2010 (JP) ................................. 2010-059705

(51) Int. Cl.
*B25D 17/14* (2006.01)
*B25F 5/00* (2006.01)
*B23Q 11/00* (2006.01)

(52) U.S. Cl.
CPC .................................. *B23Q 11/0046* (2013.01)

(58) Field of Classification Search
CPC ........... B23Q 11/0042; B23Q 11/0046; B23Q 11/006; B23Q 11/0067; B23Q 11/0071; B23Q 11/0075; A47L 7/0095
USPC .............................. 173/197–199, 217; 408/76
See application file for complete search history.

(56) References Cited

U.S. PATENT DOCUMENTS

| | | | |
|---|---|---|---|
| 5,090,499 A * | 2/1992 | Cuneo ........................... | 175/209 |
| 5,467,835 A * | 11/1995 | Obermeier et al. ........... | 175/209 |
| 5,781,955 A | 7/1998 | Hendricks | |
| 5,797,670 A | 8/1998 | Snoke et al. | |
| 6,376,942 B1 * | 4/2002 | Burger et al. .................... | 310/47 |
| 6,502,949 B1 * | 1/2003 | Horiyama et al. ............ | 362/119 |

(Continued)

FOREIGN PATENT DOCUMENTS

| JP | A-63-191580 | 8/1988 |
|---|---|---|
| JP | U-1-117882 | 8/1989 |

(Continued)

OTHER PUBLICATIONS

International Search Report issued in International Patent Application No. PCT/JP2011/052823 mailed Mar. 8, 2011.

*Primary Examiner* — Thanh Truong
*Assistant Examiner* — Joshua Kotis
(74) *Attorney, Agent, or Firm* — Oliff PLC (57) ABSTRACT

A male terminal is formed on a dust collecting device so as to protrude therefrom, while a plug-in port into which the male terminal can be inserted, and a female terminal that is located inside the plug-in port and can be electrically connected to the male terminal, are provided in a hammer drill. When the dust collecting device is joined to the hammer drill and the male terminal is electrically connected to the female terminal, a driving source is supplied from a battery pack to the dust collecting device.

8 Claims, 5 Drawing Sheets

(56) References Cited

U.S. PATENT DOCUMENTS

| | | |
|---|---|---|
| 6,615,930 B2 * | 9/2003 | Bongers-Ambrosius et al. .................... 173/198 |
| 7,017,680 B2 * | 3/2006 | Arich et al. .................... 173/198 |
| 7,182,150 B2 * | 2/2007 | Grossman .................... 173/198 |
| 7,281,886 B2 * | 10/2007 | Stoerig .................... 408/67 |
| 7,425,109 B2 * | 9/2008 | Simm et al. .................... 408/67 |
| 8,424,615 B2 * | 4/2013 | Baumann et al. .................... 173/31 |
| 8,443,914 B2 * | 5/2013 | Bito et al. .................... 173/198 |
| 8,906,124 B2 * | 12/2014 | Yoshikane et al. .................... 55/385.1 |
| 2002/0129949 A1 | 9/2002 | Bongers-Ambrosius et al. |
| 2004/0251041 A1 | 12/2004 | Grossman |
| 2005/0082920 A1 * | 4/2005 | Heigl et al. .................... 310/50 |
| 2008/0135272 A1 * | 6/2008 | Wallgren .................... 173/217 |

FOREIGN PATENT DOCUMENTS

| | | |
|---|---|---|
| JP | A-3-128625 | 5/1991 |
| JP | U-5-63781 | 8/1993 |
| JP | U-3017864 | 11/1995 |
| JP | A-11-111002 | 4/1999 |
| JP | A-2000-126917 | 5/2000 |
| JP | A-2001-179705 | 7/2001 |
| JP | A-2001-300867 | 10/2001 |
| JP | A-2002-307332 | 10/2002 |

\* cited by examiner

DRIVING SOURCE SUPPLY SYSTEM OF POWER TOOL AND ATTACHMENT DEVICE

TECHNICAL FIELD

The present invention relates to a system that supplies driving source to an attachment device in an attachment device-equipped electric power tool that is an electric power tool, such as a power drill or a hammer drill, mounted with an attachment device such as a dust collecting device.

BACKGROUND ART

Electric power tools such as a power drill or a hammer drill are sometimes mounted with an attachment device such as a dust collecting device that collects and gathers powder dust produced from a worked material during a drilling operation, or a light unit that illuminates a tip of a tool. When the attachment device is used, it is necessary to supply a driving source to the attachment device. For example, Patent Literature 1 discloses a system, in which an electric power tool mounted with a battery pack as a power source is mounted with a dust collecting device as an attachment device. In this system, an interposing unit is provided on the dust collecting device such that a top face of the interposing unit is fitted to a battery pack mounting unit of the electric power tool and a lower face of the interposing unit is mountable with the battery pack. By mounting the battery pack through the interposing unit to the electric power tool, a power source for the dust collecting device is obtained from the battery pack. Furthermore, Patent Literature 2 discloses a system, in which by connecting a dust collecting device that is attached to a battery pack attaching unit of an electric power tool to an external power source, a power source is supplied from the external power source to the electric power tool and the dust collecting device.

CITATION LIST

Patent Literatures

Patent Literature 1: U.S. Pat. No. 7,182,150
Patent Literature 2: Japanese Patent Application Publication No. JP-A-2002-307332

SUMMARY OF THE INVENTION

Technical Problem

However, in the system described in the Patent Literature 1, depending on cases when the attachment device is used or the electric power tool is used alone, it is necessary to remove and mount the battery pack from/to the electric power tool or the attachment device, which takes a lot of labor. Furthermore, in the system described in the Patent Literature 2, the external power source is required to be separately carried, which is troublesome, and even when the electric power tool is used alone, the attachment device needs to be mounted, thus the usability is poor.

In view of the above, an object of the present invention is to provide a driving source supply system of an attachment device-equipped electric power tool that provides excellent usability without any trouble of switching of a driving source when an attachment device is mounted or removed.

Solution to Problem

In order to achieve the above object, according to a first aspect of the invention, there is provided a driving source supply system that supplies a driving source to an attachment device from an electric power tool which is equipped with a battery as a driving source and to which the attachment device is joined. The driving source supply system is characterized by including a male terminal is formed on one of the electric power tool and the attachment device so as to protrude therefrom, a plug-in port that is formed in the other and into which the male terminal is insertable, and a female terminal that is formed in the other, located inside the plug-in port, and electrically connectable to the male terminal, and a driving source is supplied from the battery to the attachment device by electrically connecting the male terminal to the female terminal when the attachment device is joined to the electric power tool.

According to a second aspect of the present invention, the other in which the female terminal formed is provided with a shutter that can slide between an open position and a closed position of the plug-in port, a rotary member that can rotate through engagement of one end thereof with the shutter, and urging means that urges the rotary member in a rotational direction such that the shutter slides to the closed position, while the one on which the male terminal formed is provided with a press member that comes into abutment on the other end of the rotary member when the attachment device is mounted to rotate the rotate member, against urging of the urging means, in a rotational direction such that the shutter slides to the open position in the first aspect of the present invention.

According to a third aspect of the present invention, a protection rib is provided in the one in which the male terminal formed so as to extend along the male terminal in the second aspect of the present invention.

According to a fourth aspect of the present invention, driving of the attachment device is interlocked with driving of the electric power tool in the first or second aspect of the present invention.

According to a fifth aspect of the present invention, the driving of the attachment device is stopped with a delay of a certain time from stop of the driving of the electric power tool in the fourth aspect of the present invention.

Furthermore, it is preferable that as members for mounting the attachment device to the electric power tool by sliding, a guide groove parallel to the sliding direction be provided on an outer face of the other, the other end of the rotary member protrude into the guide groove, and the press member be designed as a rail that is provided on an outer face of the one and slides in the guide groove to come into abutment on the other end of the rotary member when the attachment device is mounted (sixth aspect), that a pin provided at one end of the rotary member be loosely inserted in a groove provided in the shutter, so that the one end is engaged with the shutter and a cam provided on the other end of the rotary member protrudes into the guide groove (seventh aspect), that the plug-in port and the female terminal be formed in the electric power tool, and the male terminal be formed on the attachment device (eighth aspect), that the attachment device be a dust collecting device that collects powder dust produced from a worked material through use of the electric power tool (ninth aspect), and that the dust collecting device be detachably equipped with a dust box for collecting the powder dust (tenth aspect).

In order to achieve the above object, according to a eleventh aspect of the present invention, there is provided a driving source supply system that supplies a driving source to an attachment device from an electric power tool to which the attachment device is joined. The driving source supply system is characterized by including a battery pack that is detachably mounted to a housing of the electric power tool and serves as a driving source of the electric power tool, and an intermediate housing that is provided between the housing and the battery pack, supplies power from the battery pack to the electric power tool, and also supplies power from the battery pack to the attachment device by external wire connection to the attachment device.

In this case, it is preferable that, in the intermediate housing, a mounting face to the housing be formed on a top, and a mounting face to which the battery pack is detachably mounted be formed on a lower face, and that a pin jack be provided that a pin plug formed at a distal end of a cord connected to the attachment device is insertable in the twelfth aspect of the present invention.

Advantageous Effects of Invention

According to first and eleventh aspects of the present invention, a driving source can be supplied at the same time that the attachment device is mounted, while even after the attachment device is removed, the electric power tool can be used alone. Therefore, usability is excellent without any trouble of switching of the driving source when the attachment device is mounted or removed.

According to second aspect the present invention, in addition to the effect of the first aspect of the present invention, when the male terminal is inserted, the plug-in port on the female terminal side can be reliably opened, so that reliability in plug-in connection can be secured. Furthermore, since the rotary member slides the shutter, a mechanism for opening/closing the plug-in port can be formed in a space-saving manner, being no obstacle to making devices compact.

According to third aspect the present invention, in addition to the effect of the second aspect the present invention, the protection rib has an effect of preventing the male terminal from being damaged.

According to fourth aspect the present invention, in addition to the effects of first or second aspect the present invention, the attachment device is interlocked with the electric power tool, so that usability further improves without any trouble for driving and stop of the driving of the attachment device.

According to fifth aspect the present invention, in addition to the effect of fourth aspect the present invention, by providing a delay function, a function of the attachment device can remain for a certain time from stop of the driving of the electric power tool, which is convenient. For example, when the dust collecting device is used as the attachment device, even after the driving of the electric power tool stops, powder dust remaining in dust collecting channels can be reliably collected, so that high performance in collecting dust is achieved.

DESCRIPTION OF EMBODIMENTS

Embodiments of present invention will be described hereinafter on the basis of the drawings.

First Embodiment

Figure 1:
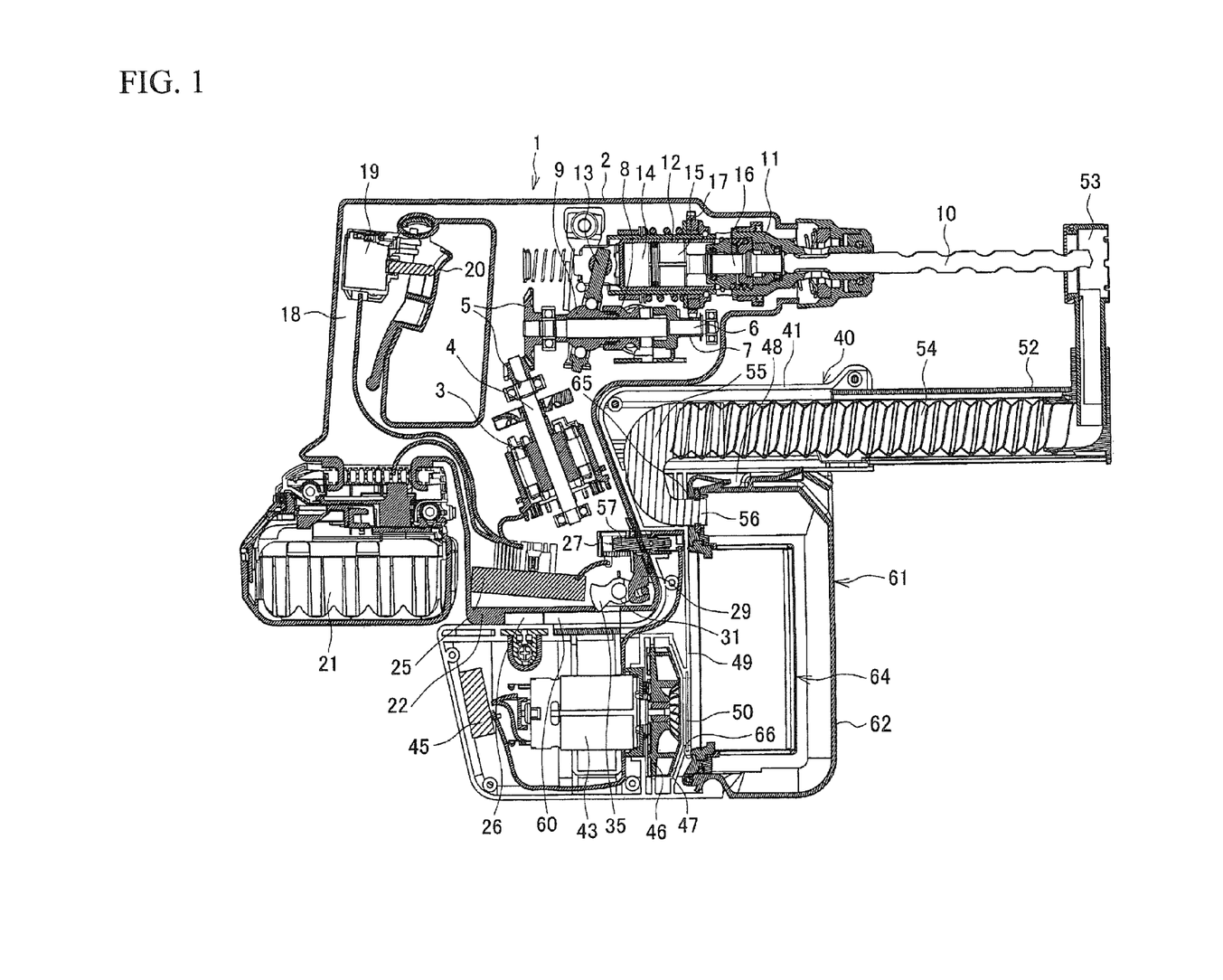
FIG. 1 is an explanatory view of a driving source supply system according to a first embodiment of the present invention.
Figure 2:
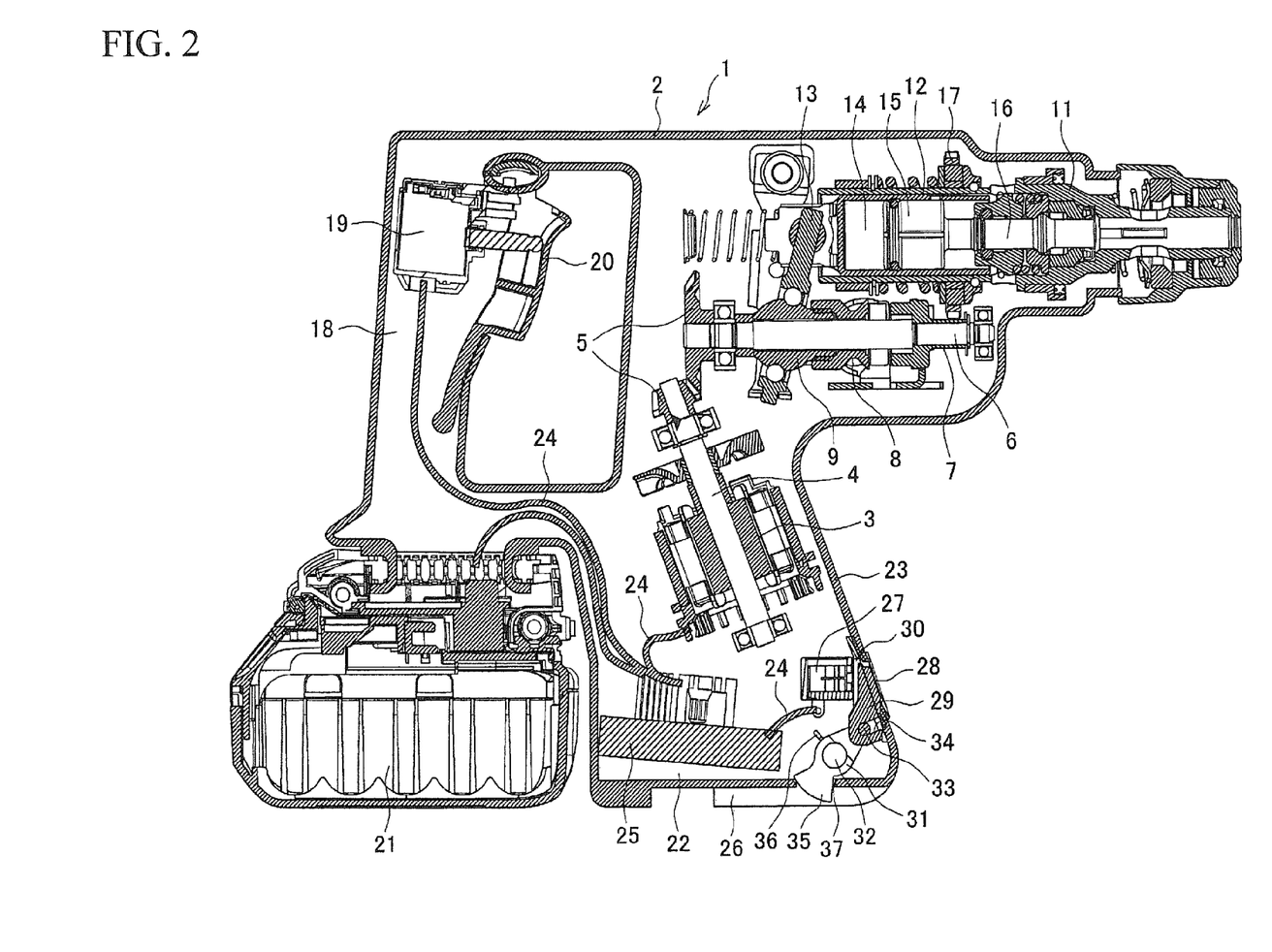
FIG. 2 is a vertical cross section of a hammer drill according to the first embodiment of the present invention.

FIG. 1 illustrates a hammer drill as an electric power tool that is mounted with a dust collecting device as an attachment device. FIG. 2 illustrates a hammer drill alone. First, in a hammer drill (1), a motor (3) is accommodated so as to be in an inclined position in such a manner that an output shaft (4) is inclined backward and to be at a center on a front side (the right side is defined as the front side in FIGS. 1 and 2) of a housing (2). This housing (2) is formed by assembling a pair of right and left half housings. Above the motor (3), a first gear (7), a clutch (8), and a boss sleeve (9) are arranged in this order from the front side on an intermediate shaft (6) to which torque is transmitted through bevel gears (5) and (5). Above the intermediate shaft (6), a tool holder (11) having a tip into which a bit (10) can be inserted and fitted is rotatably supported parallel to the intermediate shaft (6). An arm (13) provided in a periphery of the boss sleeve (9) through a swash bearing is coupled to a rear end of a piston cylinder (12) that is loosely inserted in a rear region of the tool holder (11). A striker (15) is fitted so as to be longitudinally movable inside the piston cylinder (12) through an air chamber (14) and can strike an impact bolt (16) provided in front of the striker (15). The first gear (7) meshes with a second gear (17) mounted to the tool holder (11).

Meanwhile, a handle (18) equipped with a switch (19) and a switch lever (20) is formed in an upper rear portion of the housing (2). A battery pack (21) serving as a power source is mounted below the handle (18). Furthermore, a lower front portion of the housing (2) constitutes a mounting part (22) that has an inclined face portion (23) parallel to the output shaft (4) in a front face of the mounting part (22), protrudes forward of the battery pack (21) and is mounted with a dust collecting device (40). Inside the mounting part (22), a controller (25) is accommodated. The controller (25) is electrically connected to a coil of the motor (3), the switch (19), and the battery pack (21) through lead wires (24) and (24). In a lower face of the mounting part (22), a guide groove (26) is provided such that a front end of the guide groove (26) opens forward, and the guide groove (26) extends in a longitudinal direction and is inwardly recessed. Furthermore, in front of the controller (25), positive and negative female terminals (27) to be electrically connected to positive and negative male terminals (57) on a dust collecting device (40) side are provided and are electrically connected using the lead wire (24).

A rectangular plug-in port (28) is formed with an opening in the inclined face portion (23) in front of the female terminal (27), and a shutter (29) that opens and closes the plug-in port (28) is provided inside the mounting part (22). The shutter (29) is a plate body having a front face designed as an inclined face that matches the inclined face portion (23) and decreases in thickness upward. The shutter (29) is vertically movably supported between a closed position and an open position of the plug-in port (28) by seats (30) respectively provided on inner faces of right and left half-housings so as to protrude from the inner faces in a vertical direction. Furthermore, a rotary link (31) as a rotary member is provided in a lower portion of the mounting part (22) behind the shutter (29). The rotary link (31) is rotatably supported at a center thereof by a lateral shaft 32 in the mounting part (22). A pin (33) laterally provided at a front end of the rotary link (31) is loosely inserted in an inclined groove (34) that is provided in a lower portion of the shutter (29) and inclined downward and backward. Meanwhile, a fan-shaped cam (35) is formed at the other end. Furthermore, the rotary link (31) is rotationally urged in a counterclockwise direction in FIG. 2 by a torsion spring (36). Accordingly, in a normal state, the cam (35) protrudes into the guide groove (26) through a permeable hole (37) provided on a bottom portion of the mounting part (22) and the shutter (29) is pressed upward by the pin (33) and held at the closed position of the plug-in port (28).

Figure 3:
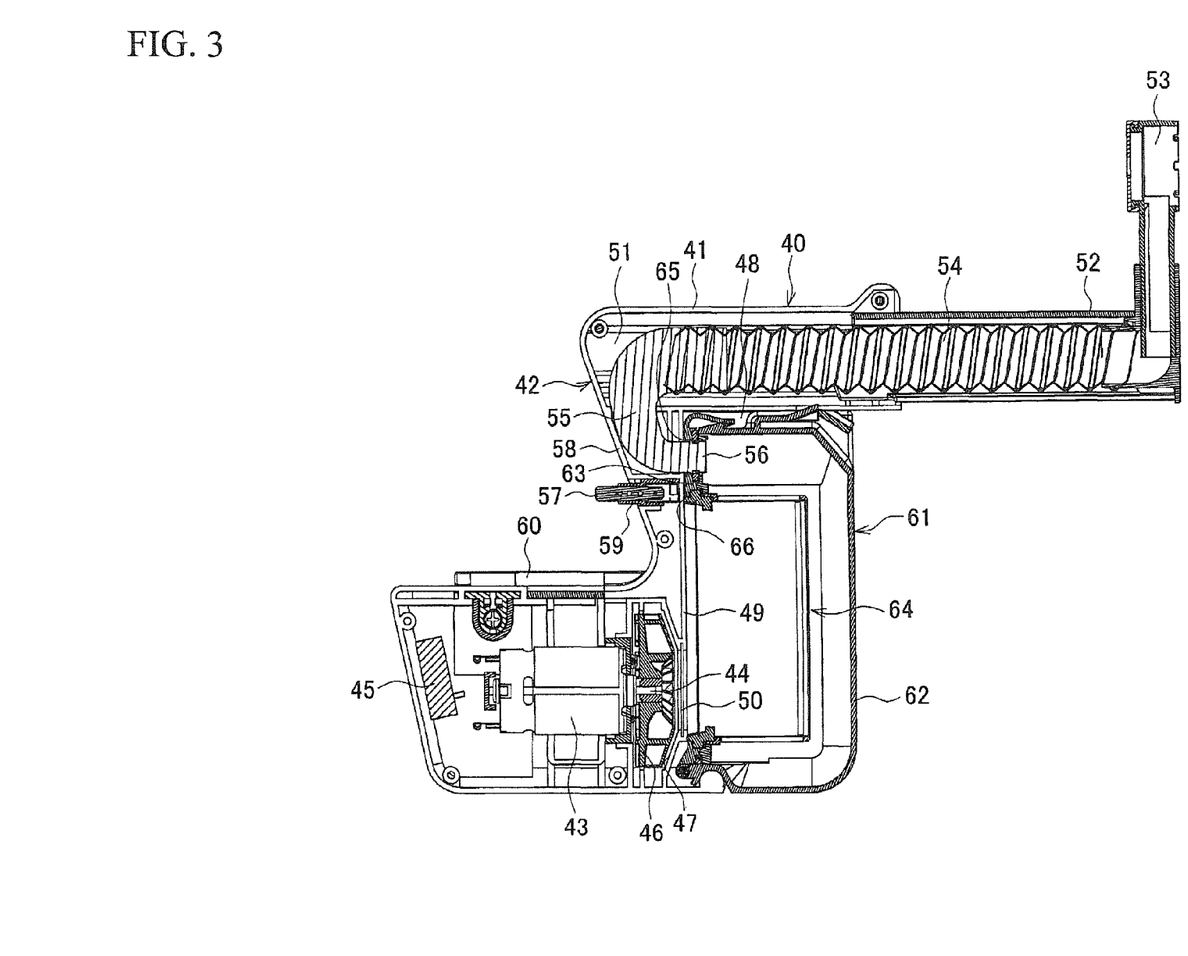
FIG. 3 is a vertical cross section of a dust collecting device according to the first embodiment of the present invention.

As illustrated in FIG. 3, the dust collecting device (40) is equipped with a fitting recess portion (42) abutting on and fitted to a bottom face and the inclined face portion (23) of the mounting part (22) of the hammer drill (1), and has a casing (41). This casing (41) is in an inverse L shape when viewed in a side view and composed of right and left half-casings assembled with each other. In a rear region of the casing (41), a motor (43) having an output shaft (44) directed forward is laterally accommodated, and behind the motor (43), a controller (45) is provided. Furthermore, a dust collecting fan (46) is secured to the output shaft (44) and accommodated in an intake chamber (47) that is defined in the casing (41) and equipped with an exhaust port (not shown) on the side. A dust box (61) formed on the casing (41) in front of the intake chamber (47) has a joint part that is denoted by (48) and that is recessed and opens only forward. A communication hole (50) through which the joint part (48) communicates with the intake chamber (47) on the same axis of the dust collecting fan (46) is formed in a partition wall (49) constituting a bottom of the joint part (48).

Meanwhile, a guide passage (51) having an open front end and a rear end curved in a U-shape to extend to a region behind the joint part (48) is longitudinally formed above the joint part (48). An L-shaped nozzle (52) is coupled to the front end of the guide passage (51) such that a suction port (53) provided in a distal end of the nozzle (52) protrudes upwards. A flexible hose (54) is so accommodated as to extend in both the nozzle (52) and the guide passage (51). A rectangular tubular duct (55) bent back in a U-shaped manner along the shape of the rear end of the guide passage (51) is coupled to a rear end of the flexible hose (54). A distal end (56) of the duct (55) as a tubular body penetrates the partition wall (49) and protrudes into the joint part (48).

Behind the joint part (48), a pair of positive and negative male terminals (57) is formed. The male terminal (57) is a plate body protruding backward and is securely plugged in an inclined back face (58) of the casing (41) which forms a fitting recess portion (42). The casing (41) is provided with a protection rib (59) that is fixed to a middle portion of the male terminal (57) and a distal end of the protection rib (59) protrudes backward. Accordingly, a protruding base portion of the male terminal (57) is protected by the protection rib (59). Furthermore, as a press member that is fitted to a guide groove (26) provided on a lower face of the mounting part (22) of the hammer drill (1), a rail (60) is provided on an upper rear face of the casing (41) forming the fitting recess portion (42) so as to protrude from the upper rear face and extend in the longitudinal direction. A dust box joined to the joint part (48) is denoted by (61), including a box body (62) to which a lid body (63) equipped with a filter unit (64) is joined with a hinge. When the dust box (61) is mounted to the joint part (48), the distal end (56) of the duct (55) penetrates an inlet (65) provided on the lid body (63), and an outlet (66) faces the communication hole (50).

In the hammer drill (1) constructed as described above, when the dust collecting device (40) is mounted to the hammer drill (1), the rail (60) of the dust collecting device (40) is adjusted to the guide groove (26) on the lower surface of the mounting part (22) of the hammer drill (1) and the dust collecting device (40) is slid backward such that the fitting recess portion (42) is fitted from the front of the mounting part (22). Then, the rail (60) slides in the guide groove (26) backwards, abuts on the cam (35) of the rotary link (31) in the middle, and presses the cam (35) upwards to rotate the rotary link (31) clockwise in FIG. 2. Accordingly, the pin (33) pulls in the shutter (29) to the open position located below, thus opening the plug-in port (28). At this moment, the pin (33) pulls in the shutter (29) while sliding relatively forward in the inclined groove (34) of the shutter (29), so that even with the same amount of rotation, the shutter (29) can be slid downward with a larger stroke owing to inclination of the inclined groove (34).

After that, the male terminal (57) of the dust collecting device (40) enters the housing (2) from the open plug-in port (28), and is, at the same time of the mounting part (22) being fitted into the fitting recess portion (42), inserted in the female terminal (27) to be electrically connected thereto (FIG. 1).

Then, when the switch (19) is turned on by an operation of pressing the switch lever (20) of the hammer drill (1), the motor (3) is driven to rotate the intermediate shaft (6). At this moment, through an operation of sliding the clutch (8) from outside the housing (2), a selection can be made among a forward position in engagement only with the first gear (7), a backward position in engagement only with the boss sleeve (9), and an intermediate position in engagement with both the first gear (7) and the boss sleeve (9) at the same time. This selection enables a selection among modes including a drill mode in which the tool holder (11) rotates through the second gear (17) to rotate the bit (10), a hammer mode in which the piston cylinder (12) is reciprocated by the rocking of the arm (13) and the interlocked striker (15) strikes the bit (10) through the impact bolt (16), and a hammer drill mode in which the tool holder (11) rotates and the impact bolt (16) strikes the bit (10) at the same time.

Meanwhile, in response to the turning-on of the switch (19), the controller (25) supplies power to the controller (45) of the dust collecting device (40). Accordingly, the controller (45) drives the motor (43) and rotates the dust collecting fan (46). Thus, outside air is sucked from the suction port (53) of the nozzle (52), goes through the flexible hose (54) and the duct (55) to be discharged from the inlet (65) into the box body (62), and then flows through the filter unit (64). The outside air reaches to the intake chamber (47) from the outlet (66) through the communication hole (50), and is discharged to the outside from the exhaust port provided in the intake chamber (47). Accordingly, powder dust produced from a worked material by the bit (10) in rotating or like, is sucked into the suction port (53), enters the box body (62) through the nozzle (52), the flexible hose (54), and the duct (55) and is captured by the filter unit (64) to be trapped in the box body (62).

It should be noted that when the switch (19) is turned off by canceling the operation of pressing the switch lever (20), the motor (3) stops and then the rotation and the like of the bit (10) stop. However, the controller (25) is provided with a delay function of stopping the supply of power to the dust collecting device (40) with a delay of several seconds from the turning-off of the switch (19). In the dust collecting device (40), therefore, the dust collecting fan (46) continues to rotate for several seconds after the bit stops. Accordingly, the powder dust remaining in the nozzle (52), the flexible hose (54), and the like can also be reliably collected into the dust box (61).

Meanwhile, as for the removal of the dust collecting device (40), the dust collecting device (40) is slid forward from the hammer drill (1) as opposed to the case of mounting. Then, the dust collecting device (40) slides forward by the guidance of the rail (60) in the guide groove (26) and the male terminal (57) separates from the female terminal (27) to be drawn out from the plug-in port (28). After that, the rotary link (31) is released from pressing of the cam (35) upward by the advanced rail (60), and rotates counterclockwise by the urging of the torsion spring (36) and presses the shutter (29) upwards through the pin (33). Therefore, the shutter (29) returns to the closed position to close the plug-in port (28).

As described above, in the driving source supply system in accordance with the first embodiment of the present invention, the male terminal (57) is formed on the dust collecting device (40) so as to protrude therefrom, while the plug-in port (28) into which the male terminal (57) can be inserted, and the female terminal (27) that is located inside the plug-in port (28) and can be electrically connected to the male terminal (57), are provided in the hammer drill (1). When the dust collecting device (40) is joined to the hammer drill (1) and the male terminal (57) is electrically connected to the female terminal (27), a driving source is supplied from the battery pack (21) to the dust collecting device (40). That is, the driving source can be supplied at the same time that the dust collecting device (40) is mounted, and even after the dust collecting device (40) is removed, the hammer drill (1) can be used alone. Therefore, usability is excellent without any trouble of switching of the driving source when the dust collecting device (40) is mounted or removed.

Especially in this case, the hammer drill (1) where female terminal (27) is formed, has the shutter (29) slidable between the open position and the closed position of the plug-in port (28), the rotary link (31) rotatable through engagement of one end thereof with the shutter (29), and the torsion spring (36) that urges the rotary link (31) in a rotational direction in which the shutter (29) slides to the closed position. The dust collecting device (40) where the male terminal (57) is formed, has the rail (60) that comes into abutment on the cam (35) of the rotary link (31) to rotate the rotary link (31), against the urging of the torsion spring (36), in a rotational direction in which the shutter (29) slides to the open position as the dust collecting device (40) is mounted, and a protection rib (59) that extends along the male terminal (57). Thus, the plug-in port (28) on the female terminal (27) side can be reliably opened when the male terminal (57) is plugged therein, and as a result, reliability in plug-in connection can be ensured. In addition, since the shutter (29) is slid by the rotary link (31), a mechanism for opening/closing the plug-in port (28) can be formed in a space-saving manner, being no obstacle to making devices compact. Furthermore, the protection rib (59) can have an effect of preventing the male terminal (57) from being damaged.

Meanwhile, since driving of the hammer drill (1) is interlocked with driving of the dust collecting device (40), usability further improves without any trouble for driving or stop of the driving of the dust collecting device (40).

Furthermore, the delay function of delaying the stop of the driving of the dust collecting device (40) from stop of the driving of the hammer drill (1) is provided, so that the powder dust remaining in the nozzle (52), the flexible hose (54), and the like can be reliably collected into the dust box (61). Thus, high performance of collecting the dust can be achieved.

It should be noted that the rotary link is rotatable around the lateral shaft in the first embodiment, but the rotary link may be provided rotatably around a longitudinal shaft and coupled at one end to the shutter, and the shutter may be pulled in downward by the rotation of the rotary link resulting from the entrance of the rail, due to a tapered face or tapered faces provided on the rear face of the rail and/or the front face of the cam at the other end of the rotary link. That is, the rotational direction of the rotary member and the manner of abutment on the press member can be appropriately changed.

Furthermore, it is also possible to provide the shutter and the rotary member above or beside the female terminal and slide the shutter upward or sideward to open the plug-in port, or the arrangement of the male terminal and the female terminal may be made reverse to the description above. That is, it is possible to provide the electric power tool and the attachment device with the male terminal and the female terminal, respectively.

Meanwhile, in the male terminal, the shape of the protection rib can obviously be changed. It is also conceivable to make, for example, such a design change that the protection rib is retractably provided on the casing of the dust collecting device so that urging means such as a coil spring or the like urges, in a normal state, the protection rib toward a protrusion position to protect the male terminal and the protection rib comes into abutment on the housing side of the electric power tool and retreats when the dust collecting device is mounted to the electric power tool.

Next, another embodiment of the present invention will be described. It should be noted, however, that component parts identical to those of the first embodiment are denoted by the same reference symbols, and that the same description will be omitted.

Second Embodiment

Figure 4:
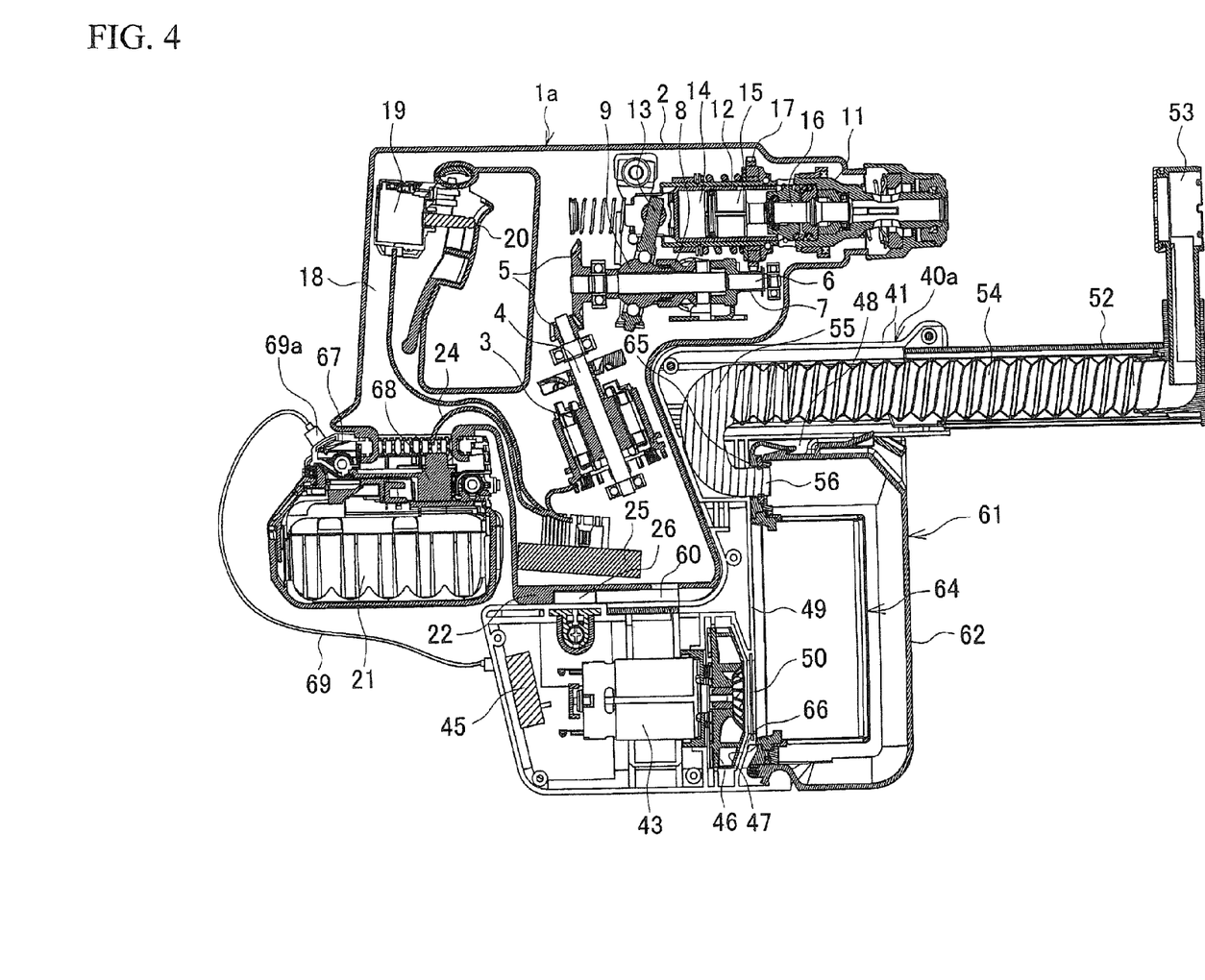
FIG. 4 is an explanatory view of a driving source supply system according to a second embodiment of the present invention.

In a hammer drill (1*a*) illustrated in FIG. 4, an intermediate housing (67) is interposed between the housing (2) and the battery pack (21). An upper face of the intermediate housing (67) is fitted to the housing (2), while a lower face forms a mounting face to or from which the battery pack (21) can be mounted or removed. A terminal board (68) provided on the mounting face and electrically connectable to a battery pack (21) is connected to the controller (25) using the lead wire (24). The battery pack (21) is slid from the left side in FIG. 4 and mounted to the mounting face of the intermediate housing (67).

A pin jack capable of outputting a power source of the battery pack (21) to the outside is provided on a rear face of the intermediate housing (67) and can be plugged in by a pin plug (69*a*) provided at a distal end of a code (69) that is connected to and externally drawn from a controller (45) of a dust collecting device (40*a*). The other structures of the hammer drill (1*a*) and the dust collecting device (40*a*) are the same as those in the first embodiment, excluding a structure of electric connection of the male terminal and the female terminal.

Accordingly, in this driving source supply system, when the rail (60) is fitted to the guide groove (26) to mount the dust collecting device (40*a*) to the mounting part (22) and the pin plug (69*a*) of the dust collecting device (40*a*) is plugged into the pin jack of the intermediate housing (67), power can be supplied from the battery pack (21) to the dust collecting device (40*a*). As a matter of course, the hammer drill (1*a*) itself can take the driving source from the battery pack (21), thus the hammer drill (1*a*) can be used alone even when the pin plug (69*a*) is drawn out of the pin jack to remove the dust collecting device (40*a*).

As described above, in the driving source supply system in the second embodiment, the driving source can be supplied almost at the same time that the dust collecting device (40*a*) is mounted, while even after the dust collecting device (40*a*) is removed, the hammer drill (1*a*) can be used alone. Therefore, usability is excellent without any trouble of switching of the driving source when the dust collecting device (40a) is mounted or removed.

It should be noted that the battery pack is slid and mounted, but the battery pack may be mounted in other mounting manners such as insertion into the housing by adjusting the mounting face of the intermediate housing according to the mounting manner. Furthermore, the manner of wire connection between the attachment device and the intermediate housing can be appropriately changed by changing the position of the pin jack, drawing the cord from the intermediate housing to be inserted into and connected to the attachment device, or making the cord as a separate body from the attachment device to be inserted into and connected to both of the electric power tool and the attachment device, or the like.

Third Embodiment

Figure 5:
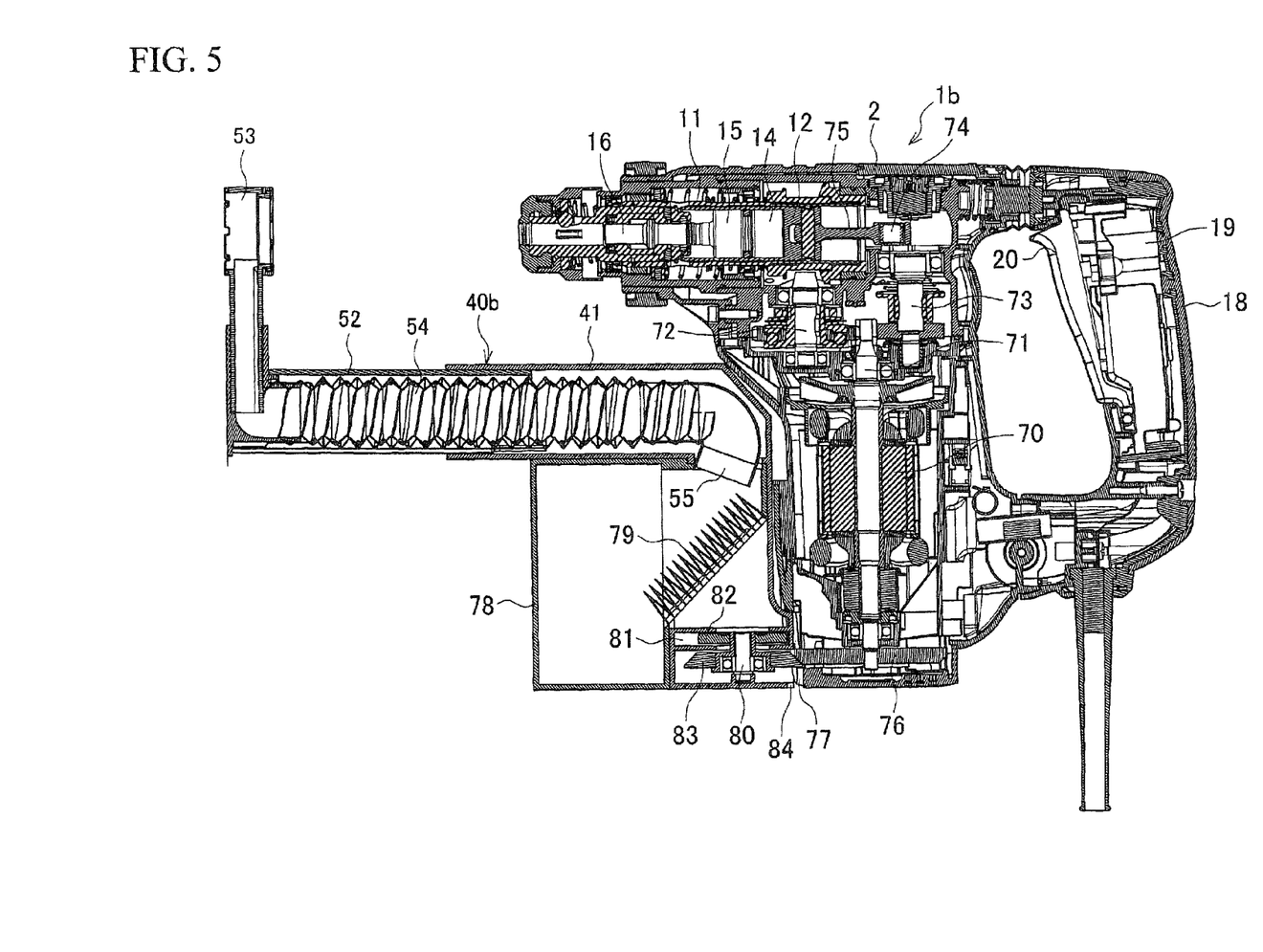
FIG. 5 is an explanatory view of a driving source supply system according to a third embodiment of the present invention.

A hammer drill (1b) illustrated in FIG. 5 is an AC tool using a commercial power supply as a driving source. The housing (2) accommodates a motor (70) with an output shaft (71) placed upwards in a lower front portion (the left side is defined as the front side in FIG. 5). An intermediate shaft (72) to which a rotation is transmitted from the output shaft (71) is located in the front side and transmits the rotation to the tool holder (11). Meanwhile, a crank shaft (73) to which a rotation is transmitted from the output shaft (71) is located in the back side. An eccentric pin (74) is provided on the upper end of the crank shaft (73) so as to protrude from the upper end and is connected through a connecting rod (75) to the piston cylinder (12). Thus, the rotation of the crank shaft (73) is converted to reciprocating movement of the piston cylinder (12) to allow the striker (15) to strike. Furthermore, a driving wheel (76) having a downward tapering side face is attached to the lower end of the output shaft (71). At the front lower end of the housing (2), a window (77) that exposes the tapering face of the driving wheel (76) is formed vertically from the lower face of the housing (2).

The dust collecting device (40b) is not equipped with the motor inside the casing (41). A distal end of the duct (55) protrudes in the upstream side of a dust collecting chamber (78) accommodating a filter (79). Meanwhile, a shaft (80) is rotatably and vertically supported in the downstream side of the filter (79). In an upper end of the shaft (80), a dust collecting fan (82) is accommodated, which is accommodated in an intake chamber (81) defined from the dust collecting chamber (78). To a lower end of the shaft (80), a driven wheel (83) having an upward tapering side face is attached. The driven wheel (83) exposes the side face thereof from a window 84 formed in a lower rear face of the casing (41).

The dust collecting device (40b) can be mounted to the housing (2) by the back face being slid along a lower front face of the housing (2) of the hammer drill (1b) from below to engage engagement portions (not shown) provided on the both faces each other. In this mounted state, the side face of the driven while 83 presses against the side face of the driving wheel (76) from below.

Accordingly, in the driving source supply system, when the dust collecting device (40b) is slid from the lower part of the housing (2) and mounted, the driving wheel (76) and the driven wheel (83) press against each other. When the switch (19) is turned on by pressing the switch lever (20) of the hammer drill (1b) and the output shaft (71) of the motor (70) rotates, the driving wheel (76) is integrally rotated to rotate the driven wheel (83). Accordingly, the shaft (80) in the dust collecting device (40b) is rotated to rotate the dust collecting fan (82), enabling the powder dust to be sucked from the suction port (53) and to be collected by the filter (79) in the dust collecting chamber (78). When the pressing of the switch lever (20) is cancelled to stop driving of the motor (70), both the output shaft (71) and the driving wheel (76) are stopped, which stops through the driven wheel (83) the shaft (80) and the dust collecting fan (82).

Even when the dust collecting device (40b) is removed from the hammer drill (1b), the driven wheel (83) is separated from the driving wheel (76), thus the hammer drill (1b) can be used as it is.

As described above, also in the driving source supply system in the third embodiment, the driving source can be supplied at the same time that the dust collecting device (40b) is mounted, and even after the dust collecting device (40b) is removed, the hammer drill (1b) can be used alone. Therefore, usability is excellent without any trouble of switching of the driving source the dust collecting device (40b) is mounted or removed. In particular, the driving wheel (76) is provided at the output shaft (71) to take torque, so that the dust collecting fan (82) can achieve a desired rotation speed without providing an accelerating mechanism.

It should be noted that the position and shape of the driving wheel and the driven wheel can be appropriately changed. For example, if the dust collecting device is slid from the front of the hammer drill and mounted, the side faces that are not tapering faces may be pressed against each other.

It should be noted that the attachment device in each mode is not limited to the dust collecting device. For example, a lighting unit or the like equipped with an LED or the like may be acceptable. As a matter of course, the electric power tool is not limited to the hammer drill, either. The present invention is also applicable to another kind of electric power tool such as a power drill or a power hammer.

EXPLANATION OF REFERENCE NUMERALS 1, 1a, 1b ... hammer drill, 2 ... housing, 3, 43, 70 ... motor, 4, 44, 71 ... output shaft (6) ... intermediate shaft, 10 ... bit, 11 ... tool holder, 21 ... battery pack, 22 ... mounting part, 25, 45 ... controller, 26 ... guide groove, 27 ... female terminal, 28 ... plug-in port, 29 ... shutter, 31 ... rotary link, 35 ... cam, 40, 40a, 40b ... dust collecting device, 41 ... casing, 42 ... fitting recess portion, 46, 82 ... dust collecting fan, 48 ... joint part, 50 ... communication hole, 52 ... nozzle, 53 ... suction port, 55 ... duct, 56 ... distal end, 57 ... male terminal, 60 ... rail, 61 ... dust box, 62 ... box body, 63 ... lid body, 64 ... filter unit, 67 ... intermediate housing, 69 ... pin jack, 76 ... driving wheel, 80 ... shaft, 83 ... driven wheel

The invention claimed is:

1. A driving source supply system for an attachment device-equipped electric power tool, the driving source supply system supplying a driving source to an attachment device from an electric power tool which is equipped with a battery as a driving source and to which the attachment device is joined, the driving source supply system comprising:
   a male terminal formed on one of the electric power tool and the attachment device so as to protrude therefrom;
   a plug-in port provided in the other of the electric power tool and the attachment device and into which the male terminal is insertable; and
   a female terminal formed in the other of the electric power tool and the attachment device, located inside the plug-in port, and electrically connectable to the male terminal; wherein
   a driving source is supplied from the battery to the attachment device by electrically connecting the male terminal to the female terminal when the attachment device is joined to the electric power tool, the other of the electric power tool and the attachment device in which the female terminal is formed is provided with a shutter capable of sliding between an open position and a closed position of the plug-in port, a rotary member capable of rotating through engagement of one end thereof with the shutter, and urging means urging the rotary member in a rotational direction such that the shutter slides to the closed position;

the one of the electric power tool and the attachment device on which the male terminal is formed is provided with a press member coming into abutment on the other end of the rotary member when the attachment device is mounted to rotate the rotary member, against urging of the urging means, in a rotational direction such that the shutter slides to the open position, and driving of the attachment device is interlocked with driving of the electric power tool.

2. The driving source supply system for an attachment device-equipped electric power tool according to claim 1, wherein a protection rib is provided in the one of the electric power tool and the attachment device so as to extend along the male terminal.

3. The driving source supply system for an attachment device-equipped electric power tool according to claim 1, wherein the driving of the attachment device is stopped with a delay of a certain time from stop of the driving of the electric power tool.

4. The driving source supply system for an attachment device-equipped electric power tool according to claim 1, wherein as members for mounting the attachment device to the electric power tool by sliding, a guide groove parallel to the sliding direction is provided on an outer face of the other of the electric power tool and the attachment device, the other end of the rotary member protrudes into the guide groove, and the press member is designed as a rail that is provided on an outer face of the one of the electric power tool and the attachment device and slides in the guide groove to come into abutment on the other end of the rotary member when the attachment device is mounted.

5. The driving source supply system for an attachment device-equipped electric power tool according to claim 4, wherein a pin provided at one end of the rotary member is loosely inserted in a groove provided in the shutter, so that the one end is engaged with the shutter and a cam provided on the other end of the rotary member protrudes into the guide groove.

6. The driving source supply system for an attachment device-equipped electric power tool according to claim 1, wherein the plug-in port and the female terminal are formed in the electric power tool, and the male terminal is formed on the attachment device.

7. The driving source supply system for an attachment device-equipped electric power tool according to claim 1, wherein the attachment device is a dust collecting device that collects powder dust produced from a worked material through use of the electric power tool.

8. The driving source supply system for an attachment device-equipped electric power tool according to claim 7, wherein the dust collecting device is detachably equipped with a dust box for collecting the powder dust.

* * * * *